Patented Aug. 5, 1941

2,251,738

UNITED STATES PATENT OFFICE 2,251,738

LUBRICATING OIL

Bert H. Lincoln, Ponca City, Okla., and Alfred Henriksen, deceased, late of Ponca City, Okla., by John W. Wolfe, administrator de bonis non, Ponca City, Okla., assignors, by mesne assignments, to The Lubri-Zol Development Corporation, Cleveland, Ohio, a corporation of Delaware No Drawing. Application August 24, 1938, Serial No. 226,472

6 Claims. (Cl. 252—54)

Our invention relates to lubricating oils and more particularly to an improved lubricating oil of high film strength as a new composition of matter.

This application is a continuation in part of our prior filed application, Serial No. 28,014, filed June 22, 1935.

It is well known among petroleum technologists and mechanical technologists that mineral lubricating oils are deficient in oiliness characteristics and in extreme pressure characteristics, which are the most important characters of the lubricant when used under conditions of boundary lubrication, where the viscosity of the lubricant plays little or no part. Boundary lubrication conditions are obtained when engines are operating at heavy loads, low speeds, or if for any reason the supply of lubricant is cut off or not sufficient. This last condition may exist when for mechanical reasons the lubricant pump is not functioning properly or when the lubricant feed line is clogged with foreign matter. The present-day design of automotive as well as other mechanical devices call for greater loads on rubbing surfaces and the loads so imposed are too great for mineral lubricating oils. With lubricants of high load carrying capacity, designers of mechanical devices could design for greater loads on rubbing surfaces and obtain pronounced and definite economies in a number of ways.

Extreme pressure lubrication conditions are required for cutting oils and the like and it is well known that mineral lubricants are not satisfactory for this purpose.

The above described conditions are encountered with the very best quality and most highly refined lubricating oils. In some cases, the more highly refined lubricants are weaker in extreme pressure characteristics.

The primary object of our invention is to provide lubricants of high oiliness and extreme pressure characteristics which will provide low coefficient of friction and which will allow of higher loads on rubbing surfaces during operation and will act as a safety factor in lubrication when abnormal conditions exist for one reason or another.

Another object of our invention is to provide a lubricant which will maintain a very low coefficient of friction and extreme pressure characteristics when diluted with light hydrocarbons such as are obtained in an automobile crank case by incomplete combustion of the fuel being burned in the engine.

A further object of our invention is to provide a lubricant having penetrative lubricity characteristics. It has been found that our lubricants do not drain off the rubbing surfaces when idle, thereby providing a lubricating film on the rubbing surfaces at all times and being of great value to the life of the machine in cold weather starting when the lubricant is very viscous and sluggish.

Still another object of our invention is to provide extreme pressure lubricants which may be used in metal cutting, severe lubricating conditions, and the like.

We have discovered that the addition of halogenated phthalic acid to lubricants meets the objects of our invention to a surprising degree. There are several different halogen, and more specifically chlorine, derivatives, which may be used in our invention. These are the various mono-, di-, and tri-chloro phthalic acids. The mono and trichloro phthalic acids are prepared from corresponding chloro-o-toluic acid by oxidation. The mixture of di-chloro phthalic acids which results from the usual method of preparation of chloro-phthalic acid, namely, passing chlorine into a solution of phthalic anhydride in fuming sulfuric acid, then converting the chlor anhydride to the chlor acid gives excellent results when blended with ordinary refined mineral oils. One of the advantages of the chloro-phthalic acids as used in this invention is their great stability with respect to decomposition on heating which is proved by the fact that these products do not release hydrogen chloride even if heated for long periods of time. Another outstanding property of these compounds is their extremely high resistance to oxidation.

The addition of 0.75% of these compounds to a mineral oil lubricant greatly improves the Timken and Almen film strengths. The oiliness characteristic and coefficient of friction are both quite materially improved. The adhesiveness of these lubricants is much superior to straight mineral oil lubricants, giving a high margin of safety in machines which are idle a great part of the time and in which ordinary lubricants tend to drain away from the bearings. Alone, or in conjunction with other compounds such as those containing sulfur, they make excellent cutting lubricants.

The halogenated phthalic acids may also be blended with other lubricant bases, such as those obtained from synthetic processes of condensation or polymerization of unsaturated hydrocarbons, and specially treated oils of organic origin such as Voltolized oils. Other oils characterized by having lubricating viscosity may also be treated according to this invention. Such oils include animal and vegetable oils like corn oil, cotton seed oil, castor oil, lard oil, sperm oil and synthetic oils, hydrogenated oils and the like, and thickened lubricants, greases or soaps.

As little as 0.05% of the addition agents may be used with some degree of improvement but usually about 0.5% is preferred. However, as much as 10% to 20% or more may be incorporated for some special purposes. For automobile crank case lubricants quantities ranging from 0.5% to 2.5% by weight are usually employed.

The chlor phthalic acids are characterized by having a preponderance of atoms which may show secondary chemical valences. With these active atoms and the general configuration of the phthalic acid molecule all contributing to its film-forming properties, we have an ideal agent for the film protection of rubbing surfaces. Two elements in chemical combination which are very active in this connection are oxygen and chlorine. Dichlor phthalic acid contains approximately 27% by weight of oxygen and approximately 30% by weight of chlorine, therefore, there is 57% by weight of this molecule which is very active in a physico chemical fashion for forming a strong adhesive film on a metal surface. With this excess residual valence and an absolute minimum of corrosive chemical action as evidenced by the pronounced chemical stability, this compound is an outstandingly good lubricating oil addition agent.

Substituting one or more alkyl radicals on the phthalic acid molecule with halogen on either aliphatic carbon atoms or ring carbon atoms or both to give a halogenated substituted phthalic acid gives compounds highly suitable for use in this invention. The alkyl group may be of the short chain or long chain type such as methyl chloro phthalic acid, chloro methyl phthalic acid, propyl chlor phthalic acid, chloro propyl phthalic acid, isobutyl chloro phthalic acid, chloro isobutyl phthalic acid, chloro isobutyl chloro phthalic acid, decyl chlor phthalic acid, chloro decyl phthalic acid, octadecyl chloro phthalic acid, chloro octadecyl phthalic acid, chloro octadecyl chloro phthalic acid, mono parafin wax radical chloro phthalic acid, chloro mono paraffin wax phthalic acid and chloro mono paraffin wax chloro phthalic acid.

Phthalic acid with alkyl side chains and a halogen in the molecule have increased polarity and are particularly advantageous for certain purposes.

Other modes of applying the principle of our invention may be employed instead of the one explained, change being made as regards the materials employed, provided the ingredients stated by any of the following claims or the equivalent of such stated ingredients be employed.

We, therefore, particularly point out and distinctly claim as our invention:

1. A lubricating composition including a major proportion of a lubricant base and a minor proportion of a chloro phthalic acid.

2. A lubricating composition including a major proportion of a lubricant base and a minor amount of a halogen bearing derivative of phthalic acid.

3. A lubricating composition including a major proportion of a lubricant base and a minor amount of a chlorine bearing derivative of phthalic acid.

4. A lubricating composition including a major proportion of mineral oil and a minor amount of a halogen bearing derivative of phthalic acid.

5. A lubricating composition including a major proportion of mineral oil and from .05% to .20% of a halogen bearing derivative of phthalic acid.

6. A lubricating composition including a major proportion of mineral oil and approximately 0.5% of a halogen bearing derivative of phthalic acid.

BERT H. LINCOLN.
JOHN W. WOLFE,
*Administrator de bonis non of the Estate of Alfred Henriksen, Deceased.*